US009563256B2

(12) United States Patent
E et al.

(10) Patent No.: US 9,563,256 B2
(45) Date of Patent: Feb. 7, 2017

(54) PROCESSOR HIDING ITS POWER-UP LATENCY WITH ACTIVATION OF A ROOT PORT AND QUICKLY SENDING A DOWNSTREAM CYCLE

(71) Applicant: Intel Corporation, Santa Clara, CA (US)

(72) Inventors: Sun Zheng E, Balik Pulau (MY); Ting Lok Song, Bayan Lepas (MY); Poh Thiam Teoh, Seri Damansara (MY); Jennifer Chin, Sungai Ara (MY); Say Cheong Gan, Bukit Mertajam (MY); Sujea Lim, Bintangor (MY); Su Wei Lim, Klang (MY)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 13/734,577

(22) Filed: Jan. 4, 2013

(65) Prior Publication Data

US 2014/0195835 A1    Jul. 10, 2014

(51) Int. Cl.
*G06F 1/32* (2006.01)

(52) U.S. Cl.
CPC .......... *G06F 1/3253* (2013.01); *Y02B 60/1235* (2013.01)

(58) Field of Classification Search
CPC .... G06F 1/3203; G06F 1/3253; G06F 1/3209; G06F 1/325
USPC .................................................. 713/320, 323
See application file for complete search history.

(56) References Cited

U.S. PATENT DOCUMENTS

| | | | |
|---|---|---|---|
| 6,029,061 A * | 2/2000 | Kohlschmidt | 455/574 |
| 6,442,700 B1 * | 8/2002 | Cooper | 713/320 |
| 6,457,135 B1 * | 9/2002 | Cooper | 713/323 |
| 2002/0085835 A1 * | 7/2002 | Zhang et al. | 386/124 |
| 2002/0138778 A1 * | 9/2002 | Cole et al. | 713/330 |
| 2005/0038947 A1 * | 2/2005 | Lueck et al. | 710/315 |
| 2005/0221758 A1 * | 10/2005 | Busse | G06F 1/3215 455/41.2 |
| 2006/0036877 A1 * | 2/2006 | Anderson et al. | 713/300 |
| 2009/0110051 A1 * | 4/2009 | Lindsay et al. | 375/240.01 |
| 2009/0158069 A1 * | 6/2009 | Oh | 713/323 |
| 2010/0053440 A1 * | 3/2010 | Mortensen | H04N 5/44513 348/569 |
| 2010/0211717 A1 * | 8/2010 | Uehara et al. | 710/316 |
| 2010/0214278 A1 * | 8/2010 | Miura | 345/212 |
| 2010/0325463 A1 * | 12/2010 | Lindsay | 713/330 |
| 2011/0035498 A1 * | 2/2011 | Shah et al. | 709/226 |
| 2011/0040959 A1 * | 2/2011 | Choi et al. | 713/2 |

(Continued)

*Primary Examiner* — Thomas Lee
*Assistant Examiner* — Santosh R Poudel
(74) *Attorney, Agent, or Firm* — Patent Capital Group

(57) ABSTRACT

Particular embodiments described herein can offer a method that includes powering down a root port; initiating a first downstream cycle by a central processing unit (CPU) to the root port; identifying a power up activity for the CPU; and triggering an exit flow for a power state in conjunction with sending a second downstream cycle to the root port. In more particular embodiments, the triggering of the exit flow for the power state and the sending of the second downstream cycle to the root port occurs in a substantially parallel fashion. In addition, a prewake indicator can be sent to the root port to trigger the exit flow before the CPU is powered up and the second downstream cycle is sent.

24 Claims, 12 Drawing Sheets

(56) References Cited

U.S. PATENT DOCUMENTS

| | | | |
|---|---|---|---|
| 2012/0179927 A1* | 7/2012 | Sodhi | G06F 1/3206 |
| | | | 713/323 |
| 2013/0007483 A1* | 1/2013 | Diefenbaugh et al. | 713/320 |
| 2013/0060987 A1* | 3/2013 | Bolen | G06F 13/00 |
| | | | 710/316 |
| 2013/0066519 A1* | 3/2013 | Yoshikawa et al. | 701/36 |
| 2013/0232279 A1* | 9/2013 | Adar et al. | 710/3 |
| 2014/0082242 A1* | 3/2014 | Murphy et al. | 710/263 |
| 2014/0129784 A1* | 5/2014 | Chapman | G06F 1/329 |
| | | | 711/154 |

* cited by examiner

| 25 | TABLE 1: WAKE LATENCY WITHOUT AND WITH PREWAKE | |
|---|---|---|
| | WITHOUT PREWAKE | WITH PREWAKE |
| POWER WAKE LATENCY | $= T_{CPU\_UP} + T_{CYCLE} + T_{L1OFF\_EXIT}$<br>$\approx 60\ \mu s + 10\ \mu s + 40\ \mu s$<br>$\approx 110\ \mu s$ | $= T_{CPU\_UP} + T_{CYCLE}$<br>$\approx 60\ \mu s + 10\ \mu s$<br>$\approx 70\ \mu s$ |

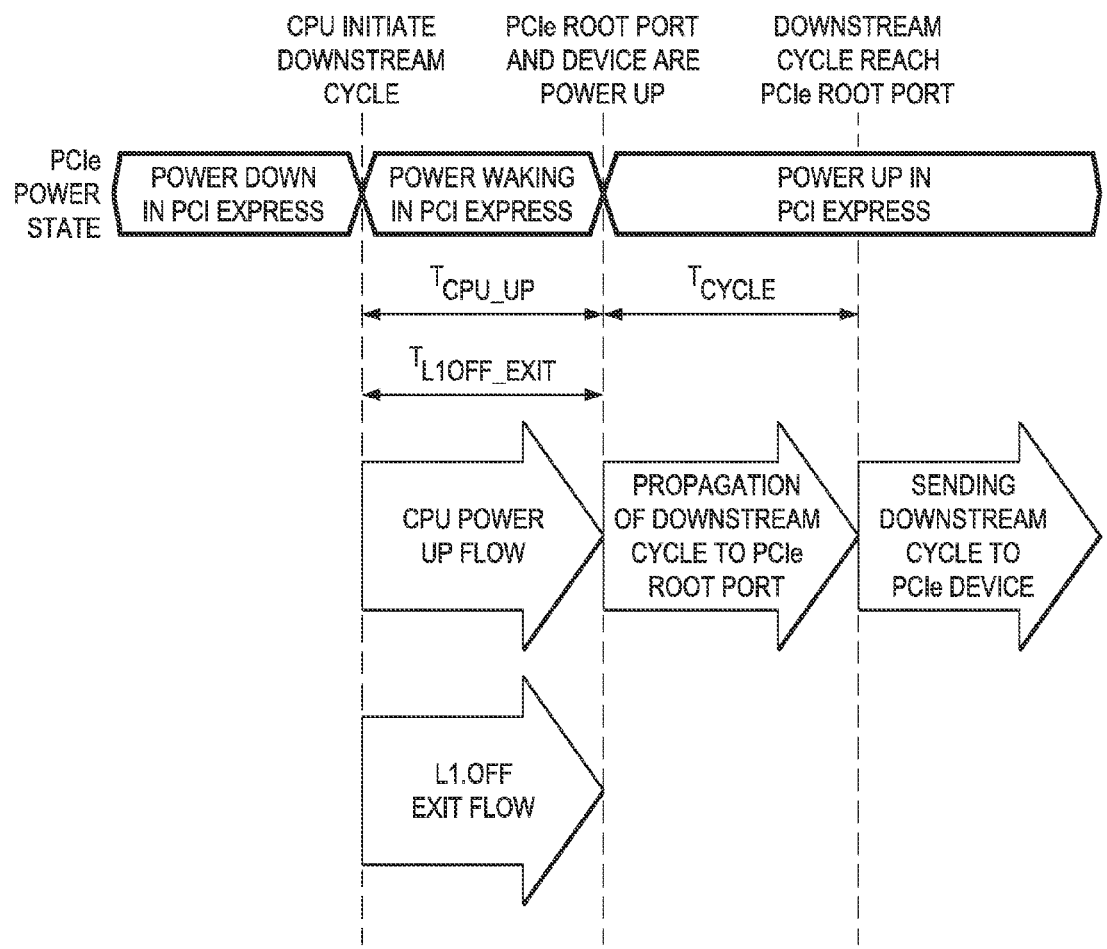

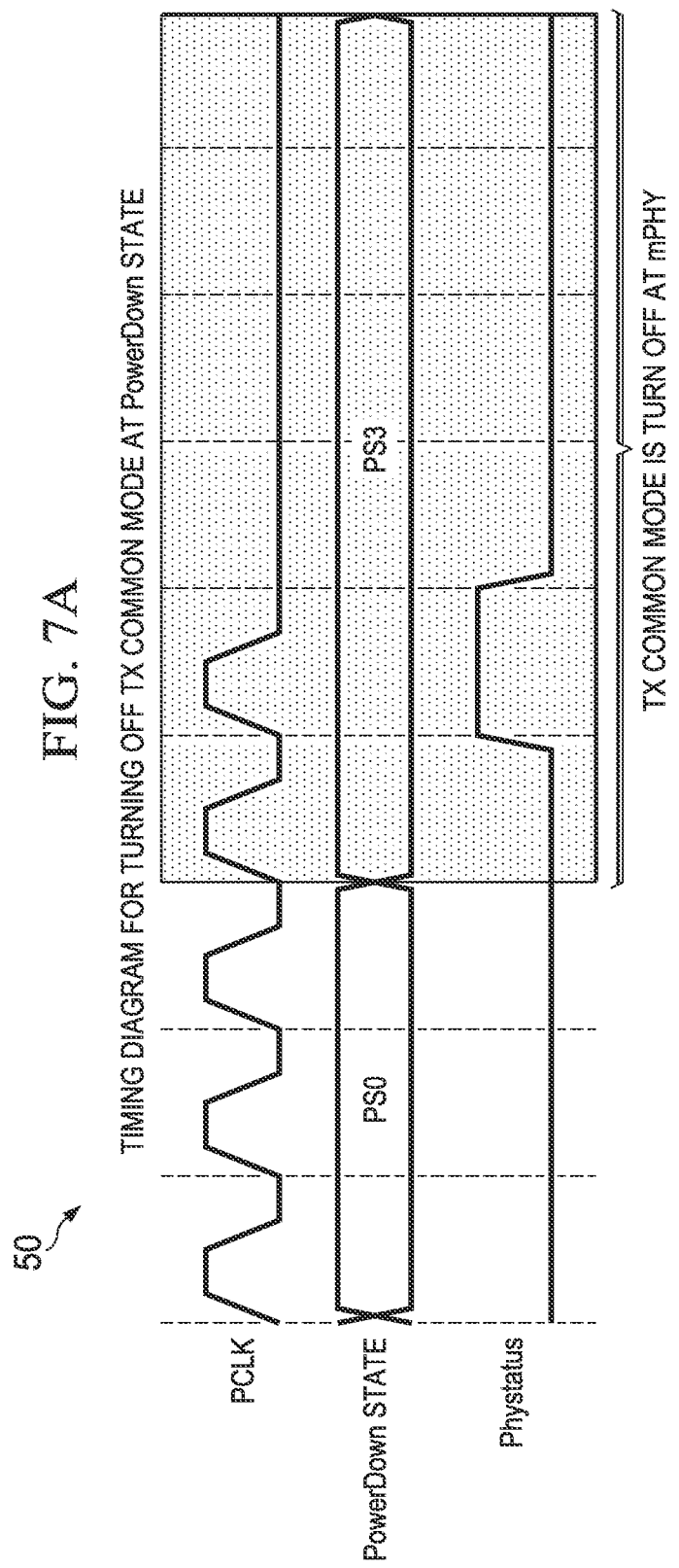

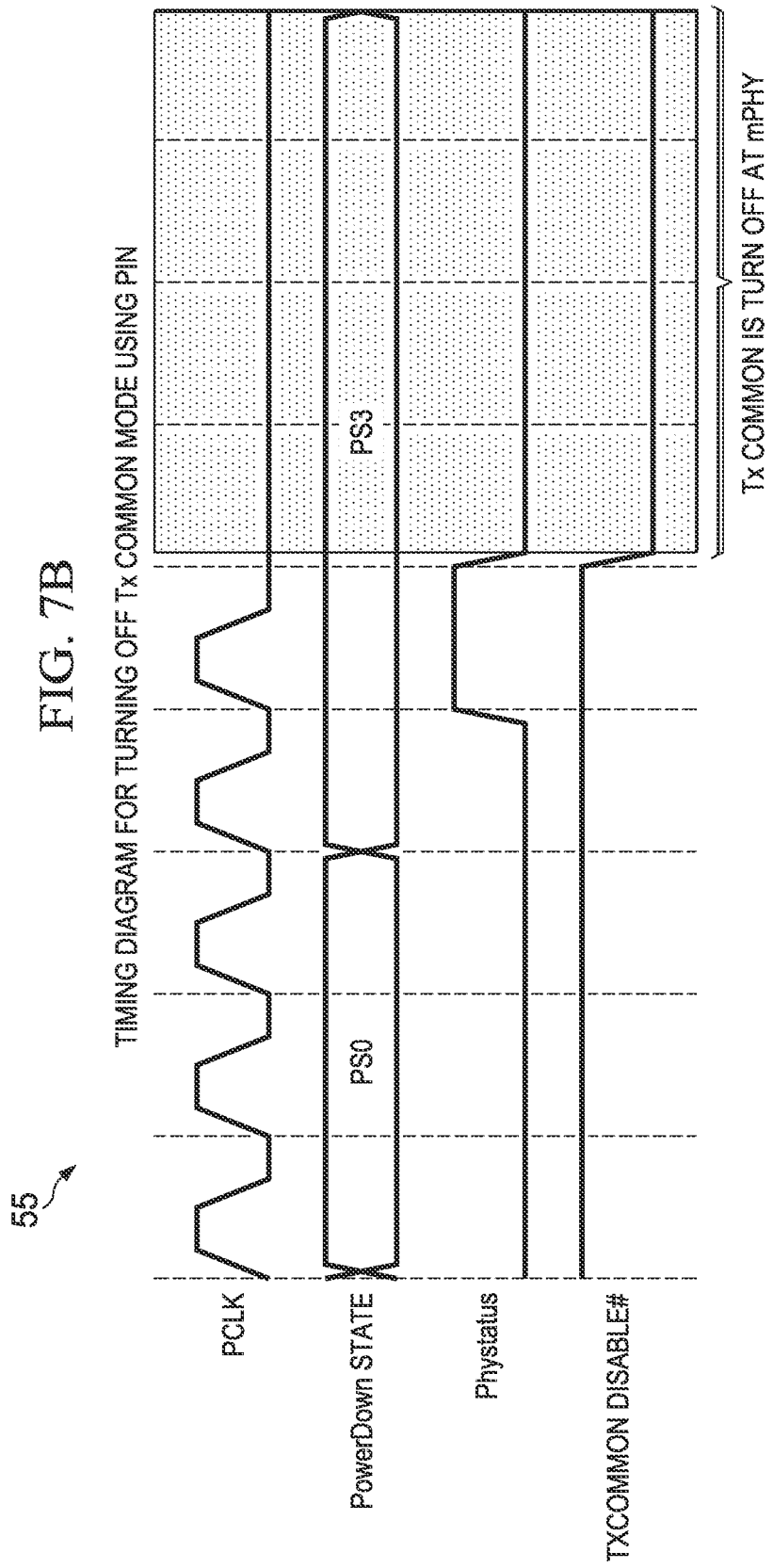

COMPARISON OF PIPE SPECIFICATION VERSUS
PIPE SPECIFICATION WITH NEW ENHANCEMENT

| PowerDown STATE | PIPE SPECIFICATION WITHOUT ENHANCEMENT Tx COMMON MODE (ON/OFF) | PIPE SPECIFICATION WITH ENHANCEMENT Tx COMMON MODE (ON/OFF) |
|---|---|---|
| PS0 | ON | ON |
| PS1 | ON | ON |
| PS2 | ON | ON |
| PS3 | N/A | OFF |
| PS4 | N/A | OFF |
| PS5 | N/A | N/A |
| PS6 | ON | ON |
| PS7 | N/A | N/A |

PROCESSOR HIDING ITS POWER-UP LATENCY WITH ACTIVATION OF A ROOT PORT AND QUICKLY SENDING A DOWNSTREAM CYCLE

TECHNICAL FIELD

Embodiments described herein generally relate to providing power savings in a processor environment.

BACKGROUND

Platform controller hubs (PCHs) represent a family of successful microchips. I/O functions have been reassigned between a new central hub and the central processing unit (CPU). Certain Northbridge functions, the memory controller, and Peripheral Component Interconnect Express (PCIe) lanes have been integrated into the CPU, while the PCH has taken over the remaining functions. As is the case with most processor environments, their Idle Power should be minimized to meet certain requirements. In many cases, there can be multiple high-speed Serial input/output (I/O) ports (including the universal serial bus (USB)) to accommodate. Hence, it becomes significant to bring down the expenditure for the PCI Express root port Idle Power by several factors.

BRIEF DESCRIPTION OF THE DRAWINGS

Embodiments are illustrated by way of example and not by way of limitation in the FIGURES of the accompanying drawings, in which like references indicate similar elements and in which:

FIG. 6 is a simplified diagram illustrating another possible set of time intervals for wake latency associated with the present disclosure;

FIGS. 7A-7B are simplified state diagrams illustrating possible activities for turning off a Common Mode associated with the present disclosure;

FIG. 8 is a simplified table illustrating metrics associated with a Common Mode turn off in accordance with one example implementation associated with present disclosure;

Figure 1A:
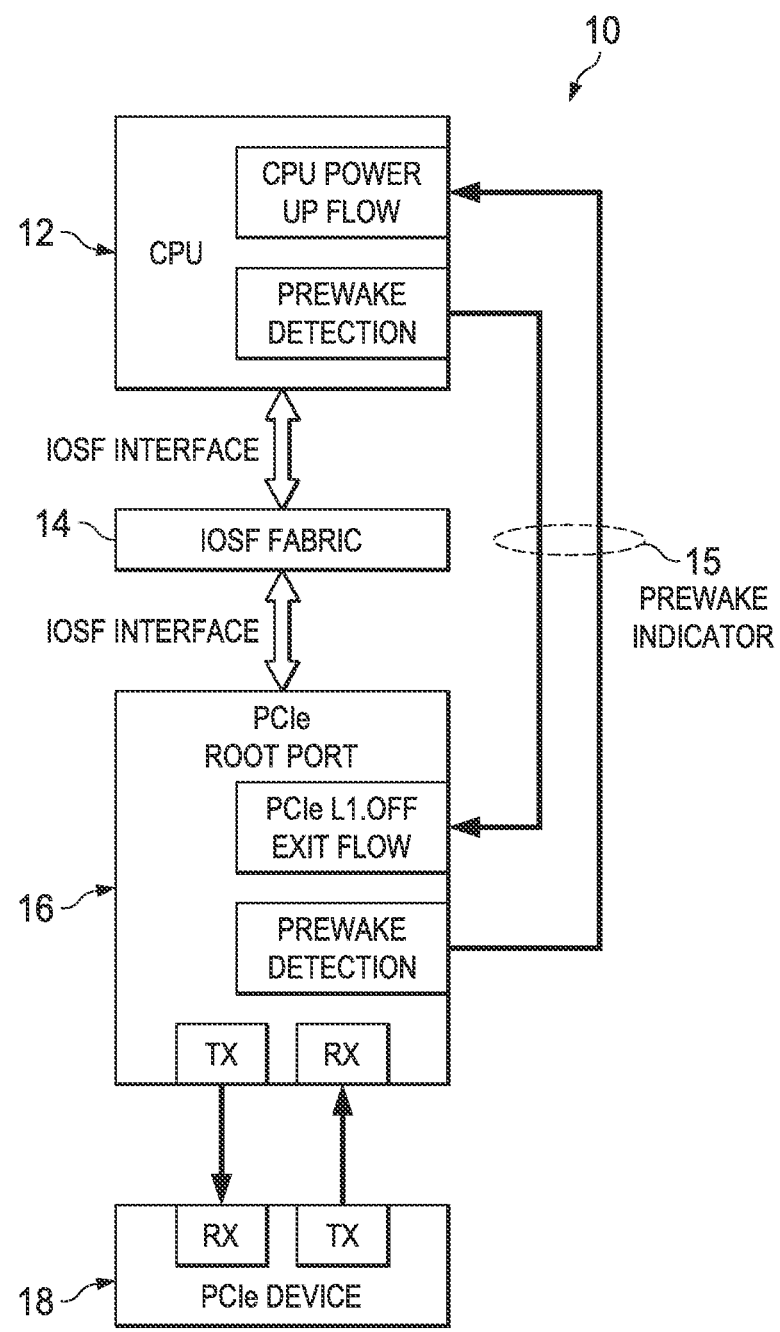
FIG. 1A is a simplified block diagram illustrating an example embodiment of a prewake system associated with the present disclosure.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to providing a power savings in a processor environment. Features such as structure(s), function(s), and/or characteristic(s), for example, are described with reference to one embodiment as a matter of convenience; various embodiments may be implemented with any suitable one or more of the described features.

Commonly, in order to achieve a significant power savings, the PCI Express offers a deeper power state that is known as L1.OFF. Typically, when the deeper power state is entered, it needs a longer time to exit the power state. The additional wake latency is caused by a deeper L1.OFF state exit (TL1OFF_EXIT) in which a PCI Express root port should wait before retransmitting on the interface. This TL1OFF_EXIT effectively is a latency penalty in return for the extra PCI Express power saving. In many cases, the latency penalty could be as much 40 µs, which deteriorates the wake performance and which inhibits the user experience (e.g., as it applies to notebooks, tablets, mobile devices, and various types of personal computers).

Particular embodiments described herein can offer a method that includes powering down a root port; initiating a first downstream cycle by a central processing unit (CPU) to the root port; identifying a power up activity for the CPU; and triggering an exit flow for a power state in conjunction with sending a second downstream cycle to the root port. In more particular embodiments, the triggering of the exit flow for the power state and the sending of the second downstream cycle to the root port occurs in a substantially parallel fashion. In addition, a prewake indicator can be sent to the root port to trigger the exit flow before the CPU is powered up and the second downstream cycle is sent.

In yet other embodiments, the root port is associated with a Peripheral Component Interconnect Express (PCIe) port. Additionally, the method can include receiving the second downstream cycle; and sending the second downstream cycle to a device. The CPU can be coupled to a plurality of high-speed serial input/output (I/O) ports.

Yet another solution associated with reducing power consumption in a processing environment includes identifying a power management state associated with a central processing unit (CPU); applying a power down state through a common mode turn off; and applying a transmit (Tx) common mode disable pin to a physical layer (PHY) in order to change a power state level associated with the CPU. In more particular instances, the common mode disable pin is de-asserted to enable the Tx common mode. More specific implementations may include receiving a status signal at an input/output (I/O) controller to indicate a power state level. The power management states can include a link disable state, a runtime state, a detect state, and an unconfigured lanes state. The PHY allows a root port to exit to a power state level by returning a status signal.

Numerous details associated with these capabilities, along with various other features and functions associated with the present disclosure are discussed below with reference to the accompanying FIGURES and descriptions.

Prewake Activities in a Processing Environment

FIG. 1A is a simplified block diagram illustrating a prewake system 10 associated with the present disclosure. This particular embodiment includes a central processing unit (CPU) 12, an On-Chip System Fabric (IOSF) 14, a Peripheral Component Interconnect Express (PCIe) root port 16, and a PCIe device 18. Any number of transmit components (Tx) and receiver components (Rx) may be provided at PCIe root port 16 and PCIe device 18. Also provided in FIG. 1A is a number of prewake signals 15 that are tied to a CPU power-up flow (of CPU 12), a PCIe L1.OFF exit flow (of PCIe root port 16), and tied to a paired set of prewake detection modules.

Prewake system 10 is configured to remove (e.g., completely) the TL1OFF_EXIT from the total wake latency to enable PCI Express devices to enter the deepest L1.OFF state as frequently as possible. This would engender a maximum power savings without incurring an additional latency penalty. The activities and protocols associated with these power-saving operations are generally referred to as 'prewake', as discussed herein. Prewake is a mechanism that allows the TL1OFF_EXIT to hide under the CPU power-up latency (TCPU_UP) during power wake. This can be done for the prewake parallelize L1.OFF exit flow with CPU power-up flow (in contrast to the serialize L1.OFF exit flow with CPU power-up flow). When the CPU power-up flow and L1.OFF exit flow is serialized (without the prewake mechanism), the CPU attempts to send a downstream cycle to a PCI Express device, where its corresponding PCI Express root port is in L1.OFF. The downstream cycle would not reach the PCI Express device until the CPU is powered up, followed by a propagation of the downstream cycle to the PCI Express root port. Upon arrival of the downstream cycle to the PCI Express root port, the L1.OFF exit flow would be triggered. When the PCI Express root port and device are powered up, the downstream cycle can be sent to the PCI Express device.

Figures 1B, 2:
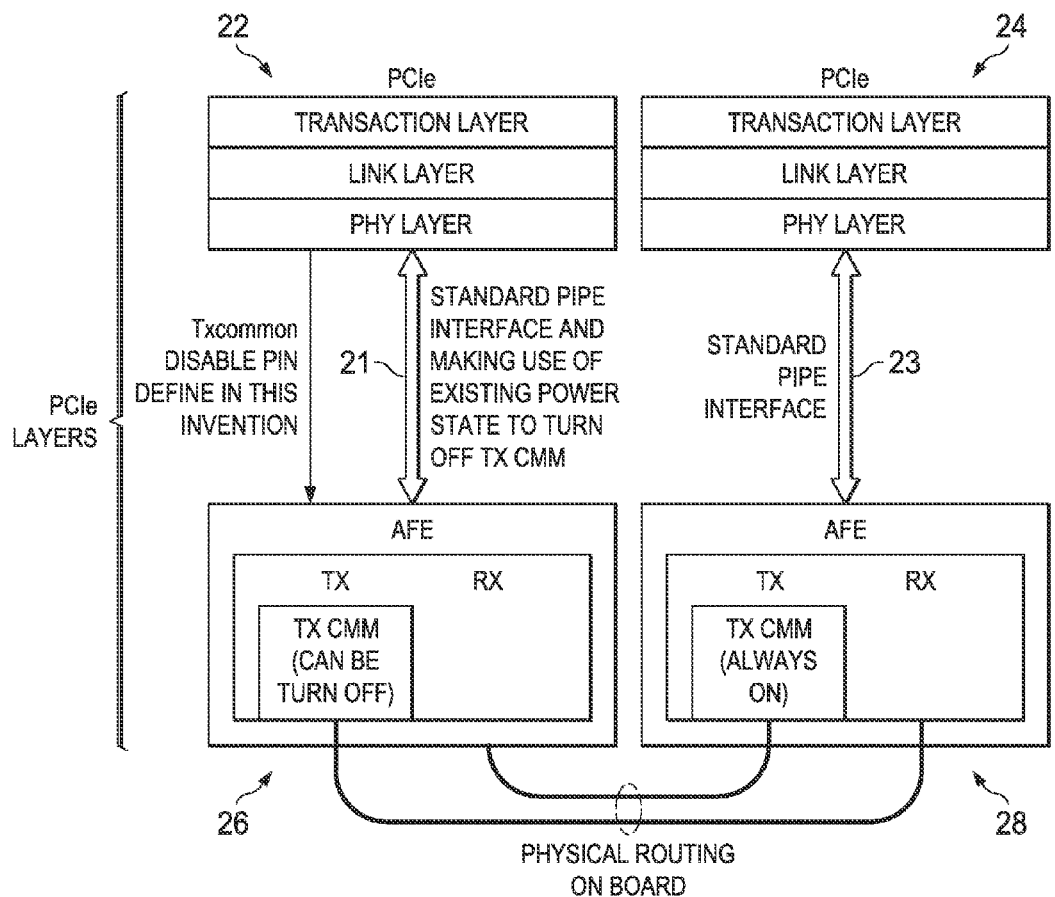
FIG. 1B is a simplified block diagram illustrating one possible implementation of the prewake system associated with the present disclosure.
FIG. 2 is a simplified table illustrating wake latency metrics with and without the prewake feature of the present disclosure.

Turning to additional FIGURES that are illustrative of these concepts, FIG. 1B is a simplified block diagram illustrating one possible implementation of the prewake system associated with the present disclosure. FIG. 1B includes an instance of a PCIe 22 implementing the teachings of the present disclosure, juxtaposed with an instance of a PCIe 24 without the benefit of the prewake features discussed herein. A number of PCIe layers are being shown in FIG. 1B, where such layers can interact with an analog front end (AFE) 26, 28. In the case of PCIe 22, a PHY Interface for a PCI Express (PIPE) interface 21 is provisioned, and it can make use of an existing power state to turn off the Tx CMM. In the case of PCIe 24, a standard PIPE interface 23 is being provisioned, as shown in FIG. 1B.

Figure 4:
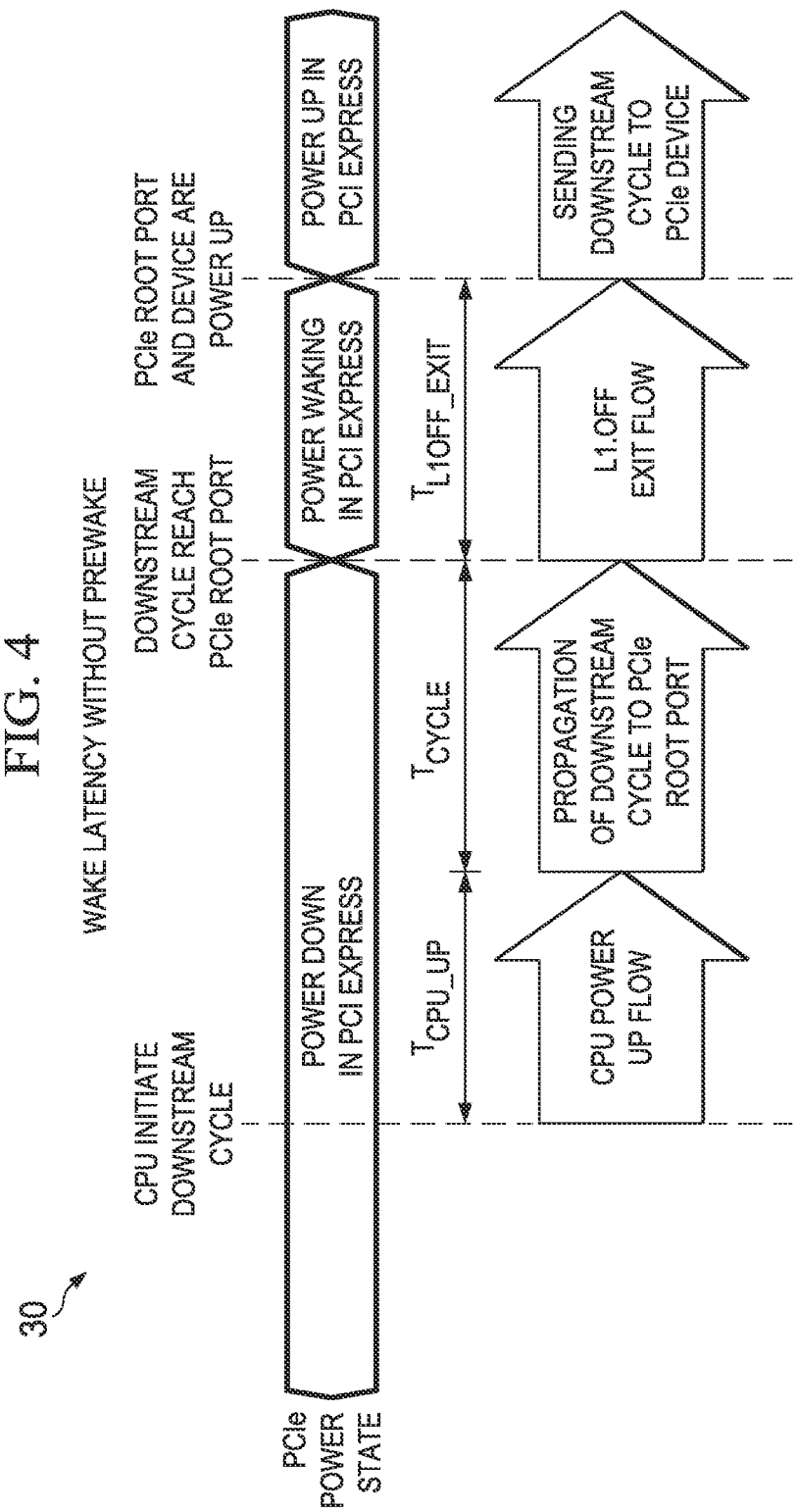
FIG. 4 is a simplified diagram illustrating one possible set of time intervals for wake latency associated with the present disclosure.

Without the prewake mechanism in place, the downstream cycle would need to wait for the TCPU_UP and the TL1OFF_EXIT serially before the cycle would be sent out to the PCI Express devices through the PCI Express root port, which previously was in L1.OFF (illustrated in FIG. 4). TL1OFF_EXIT can be exposed in wake latency. Thus, wake latency without prewake can be defined by the expression:

$$\text{Wake Latency} = T\text{CPU\_UP} + T\text{CYCLE} + T\text{L1OFF\_EXIT}.$$

FIG. 2 is a simplified table 25 illustrating wake latency metrics with and without the prewake feature in accordance with one example implementation of the present disclosure. When the L1.OFF exit flow is parallelized with a CPU power-up flow with the prewake feature (illustrated in FIG. 5), the CPU is attempting to send a downstream cycle to a PCI Express device, and its corresponding PCI Express root port is in L1.OFF. A prewake indicator can be sent to the PCI Express root port to trigger the L1.OFF exit flow before the CPU is powered up, and the downstream cycle can be propagated to the PCI Express root port.

With the prewake mechanism, the downstream cycle would wait for the TCPU_UP and the TL1OFF_EXIT in a parallel fashion, before the cycle can be sent out to PCI Express devices through the PCI Express root port, which previously was in L1.OFF. TL1OFF_EXIT can be hiding from the wake latency. Thus, wake latency with the prewake mechanism can be defined as:

$$\text{Wake Latency} = T\text{CPU\_UP} + T\text{CYCLE}$$

TCPU_UP, TCYCLE and TL1OFF_EXIT can be platform specific. The recommended values of these latencies could be in the range of approximately:

TCPU_UP=60 μs

TCYCLE≈μs

TL1OFF_EXIT.

Without prewake, the downstream cycle would wait for the TCPU_UP and the TL1OFF_EXIT serially before the cycle can be sent out to PCI Express devices through the PCI Express root port, which previously was in L1.OFF. TL1OFF_EXIT can be exposed in wake latency. As a result, the Wake Latency=TCPU_UP+TCYCLE+TL1OFF_EXIT.

With the prewake mechanism, the downstream cycle would wait for the TCPU_UP and the TL1OFF_EXIT in a parallel fashion, before the cycle can be sent out to PCI Express devices through the PCI Express root port, which previously was in L1.OFF. TL1OFF_EXIT can be hiding from wake latency. As a result, Wake Latency=TCPU_UP+TCYCLE.

Figure 3:
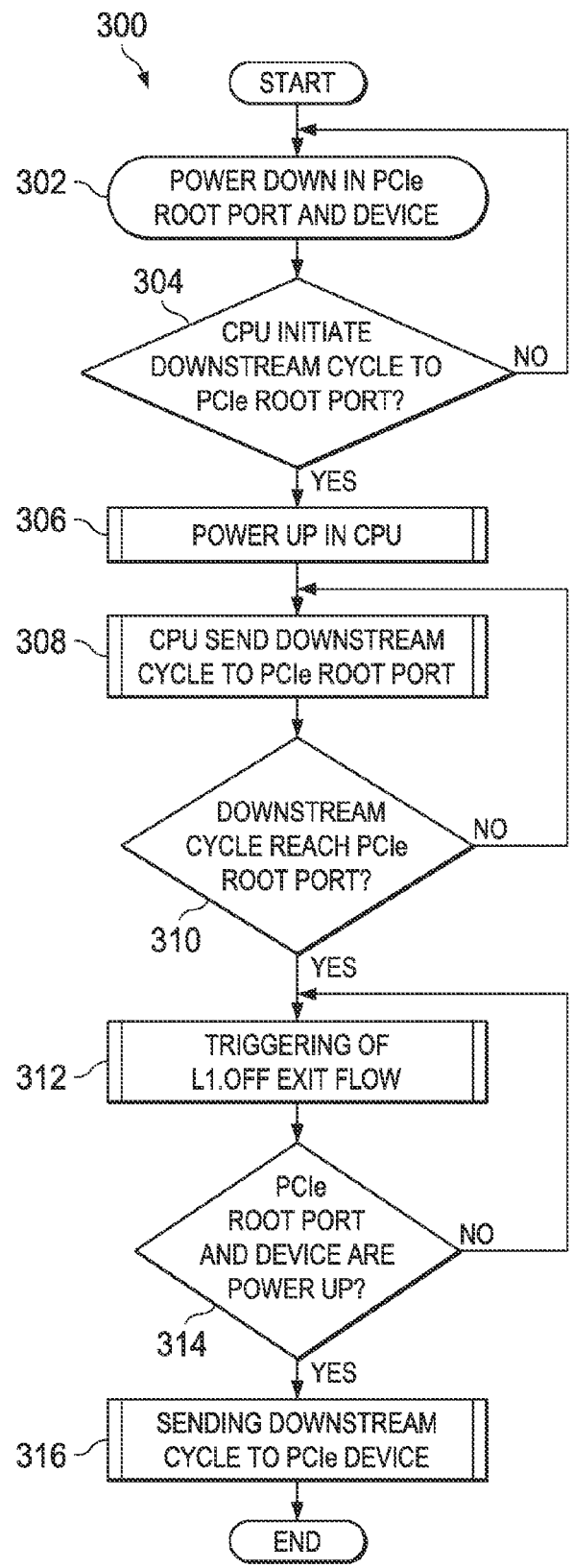
FIG. 3 is a simplified flowchart illustrating one possible set of activities for a power-up flow associated with the present disclosure.

FIG. 3 is a simplified flowchart 300 illustrating one possible set of activities for a power-up flow. More specifically, this illustration reflects a serializing of the L1.OFF exit flow with the CPU power-up flow. This particular flow may begin at 302, where there is a power down in the PCIe root port and device. At 304, the CPU can initiate a downstream cycle to the PCIe root port. At 306, there is a power-up in the CPU. At 308, the CPU can send a downstream cycle to the PCIe root port. At 310, the downstream cycle reaches the PCIe report. At 312, there is a triggering of the L1.OFF exit flow.

FIG. 4 is a simplified diagram 30 illustrating one possible set of time intervals for wake latency. More specifically, FIG. 4 is depicting a wake latency without the prewake mechanism and it tracks the activities detailed previously.

Figure 5:
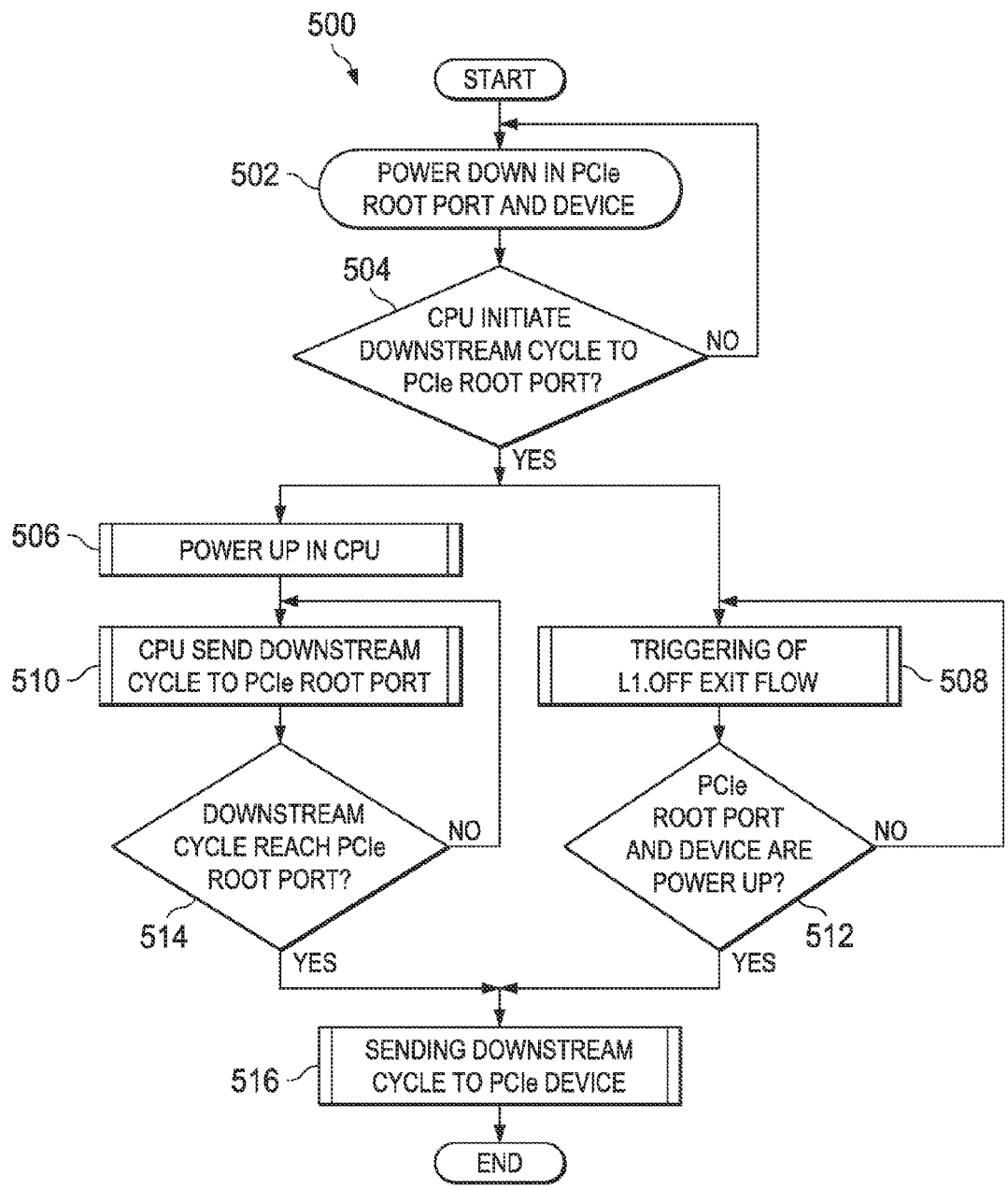
FIG. 5 is a simplified flowchart illustrating one possible set of activities for another power-up flow associated with the present disclosure.

FIG. 5 is a simplified flowchart 500 illustrating one possible set of activities for a power-up flow associated with the present disclosure. More specifically, FIG. 5 illustrates a parallelize activity of L1.OFF power wake flow with a power wake flow. This particular flow may begin at 502, where there is a power down in the PCIe root port and device. At 504, the CPU can initiate a downstream cycle to the PCIe root port. At 506, there is a power-up in the CPU, where the CPU can send the downstream cycle to the PCIe root port (generally indicated that 510). At 514, the downstream cycle reaches the PCIe root port. At 516, the downstream cycle can be sent to the PCIe device. In a parallel fashion (following along from block 504), there can be a triggering of the L.1 OFF exit flow at 508. At 512, the PCIe root port and device are powered up, which reflects an increase in speed for this particular set of operations.

Note that the prewake activities discussed herein allows the PCI Express root port and I/O controller hub to implement an L1.OFF from the PCI Express to offer a maximum power saving. In addition, such a mechanism creates a method to remove the extra latency penalty incurred by the definition of the L1.OFF exit. Moreover, such a feature can be critical to a host of possible environments, such as the applications of notebooks and tablets that use certain types of system on chips (SoCs).

FIG. 6 is a simplified diagram 40 illustrating another possible set of time intervals for wake latency associated with the present disclosure. More specifically, FIG. 6 can be compared to FIG. 4, as the depiction of FIG. 6 captures the wake latency associated with the prewake mechanism.

FIGS. 7A-7B are simplified state diagrams illustrating possible activities for turning off a Common Mode associated with the present disclosure. More specifically, FIG. 7A illustrates a diagram 50 for turning off a Tx Common Mode at a power down state. FIG. 7B illustrates a timing diagram 55 for turning off a Tx Common Mode using a pin. The activities illustrated in FIGS. 7A-7B can enhance the current PIPE 4.0 Specification to significantly reduce the mPHY Idle Power. This enhancement can be applicable to various high-speed I/O controllers including the PCI Express, serial Advanced Technology Attachment (SATA), USB, etc. [Note that a PHY (physical layer) chip is typically integrated into most USB controllers in hosts or embedded systems and provides the bridge between the digital and modulated parts of the interface.]

In operation, the mechanisms of the present disclosure can help to meet the Idle Power target for several types of high-speed I/O controllers. The enhancement in the PIPE Specification can allow a high-speed controller (e.g., PCIe) to turn off the Tx Common Mode during the L1.OFF, Detect, Runtime D3, Sx, Link Disable, and Unconfigured Lanes. Furthermore, such a mechanism can be applied to the high-speed I/O controllers equally. In one particular implementation, by disabling the Common Mode, approximately 2 mW of Idle Power is saved.

It should also be noted that such a mechanism can be hardware autonomous without any software intervention necessary, allowing it to be suitable to multiple platforms (mobile, tablet, server, client, etc.). The enhancement to the PIPE Specification provides two methods for high-speed I/O controllers to turn the mPHY Data Lanes Tx Common Mode Circuitry:

Tx Common Mode turn off through power down state; and
Tx Common Mode turned off through a pin.
For the power down state Tx Common Mode Disable:
high-speed I/O controller needs to bring down the power down state to PS3 to mPHY.
mPHY can return the PHY status back to the high-speed I/O controller to indicate it has entered PS3.
[Note the Term 'PS' Can Refer to a Designated Power State Level, or Power Savings Level, Power Sleep Level, Etc.]

At the same time, the mPHY can turn off the Tx Common Mode at this lower power state. FIG. 7A illustrates this scenario with its associated timing diagram 50.

For the pin Tx Common Mode Disable, the pin can be introduced to indicate the Tx Common Mode turn off by the high-speed I/O controller to the mPHY. This takes advantage of low-power management states that have high exit latency (such as L1.OFF). The pin indication can offer the flexibility to the high-speed I/O controller to determine when it is suitable to turn off the Tx Common Mode. One example involves the PCI Express power down to PS4. However, the system may need to wait for a signal (e.g., the CLKREQ#) to decide to turn off the Tx Common Mode. Once it has checked all the conditions to turn off the Tx Common Mode, it can assert the TxCommonModeDisable pin to the mPHY. Aside from this, when the PCI Express needs to exit from L1.OFF, it can de-assert the TxCommonModeDisable pin to the mPHY to enable the Tx Common Mode. The Tx Common Mode voltage is still not stable at such a point; however, the mPHY can allow the PCI Express root port to exit to P0 by returning the PHY status. This is due to the L1.OFF protocol having a timing specification to enable waiting for the Tx Common Mode voltage to be stable while bringing up the link. This is the example usage of taking advantage of lower power management states that have high exit latency.

FIG. 8 is a simplified table 60 illustrating metrics associated with a Common Mode turn off protocol in accordance with one example implementation associated with present disclosure. Table 60 summarizes the Tx Common Mode turn off during different power down states. Note that the Tx Common Mode is turned off using a pin. Table 60 offers a comparison of the PIPE Specification versus the PIPE Specification with the new enhancement discussed herein.

Figure 9:
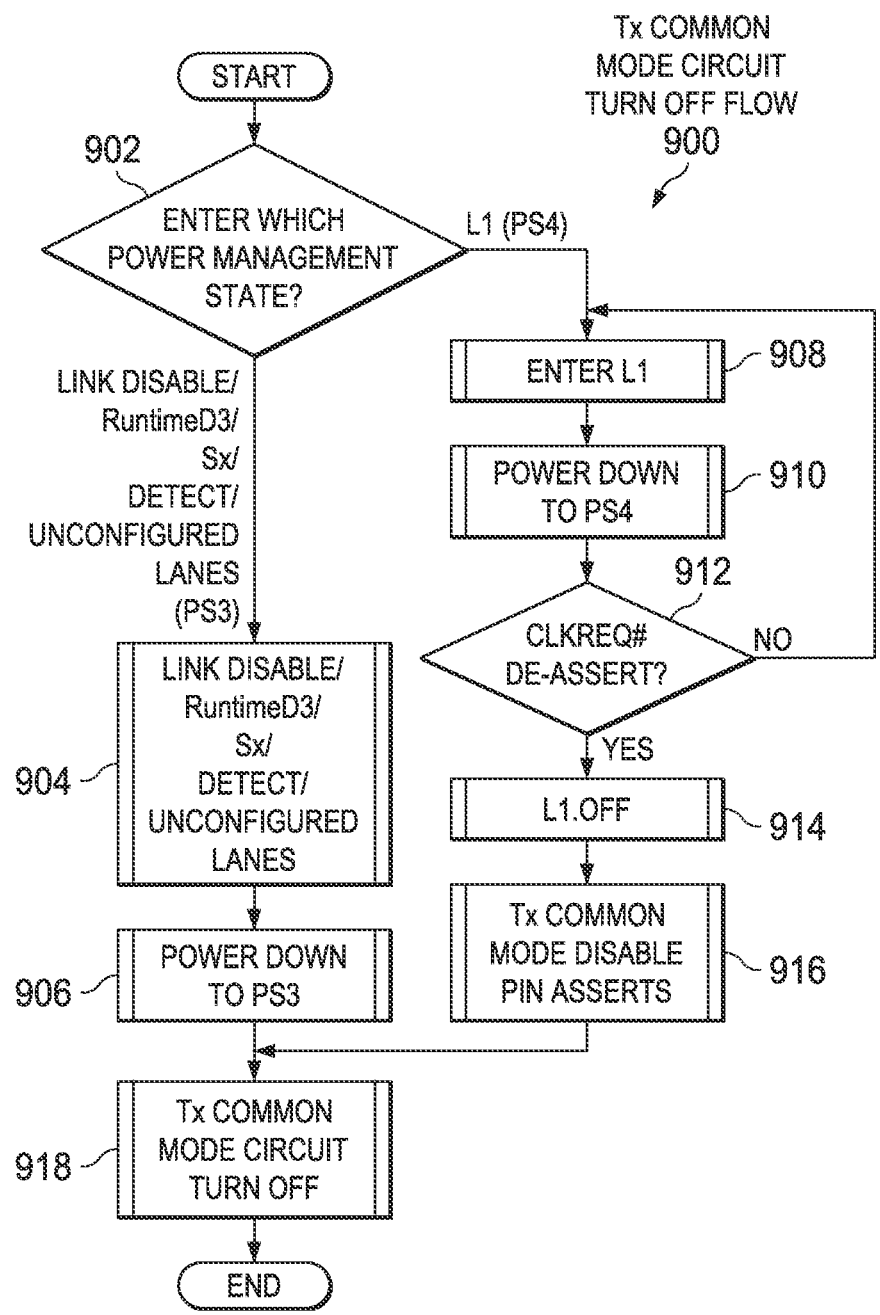
FIG. 9 is a simplified flowchart illustrating one possible set of activities for a Common Mode turn off associated with the present disclosure.

FIG. 9 is a simplified flowchart 900 illustrating one possible set of activities for a Common Mode turn off associated with the present disclosure. In particular, FIG. 9 offers an example usage model for a high-speed I/O controller PCIe implementation. In general terms, the PCIe can power down the mPHY to PS3 during Detect, Link Disable, Runtime D3, and Unconfigured Lanes. During PS3, the Tx Common Mode is turned off. The PCIe can power down the mPHY to PS4 during L1.OFF. During PS4 and L1.OFF, the Tx Common Mode is turned off using TxCommonModeDisable pin at the PCI Express root port. The mPHY can sample this pin to determine when to turn off the Tx Common Mode.

Referring to the steps of the example flow of FIG. 9, at 902, the power management state is entered. At 904, the Detect, Link Disable, Runtime D3, and Unconfigured Lanes are accounted for. At 906, the system is powered down to PS3. At 908, L1 is entered and at 910, the system is powered down to PS4. At 912, the CLKREQ# de-assert is provided. In 914, the L1.OFF is provided. At 916, the Tx Common Mode Disable pin is asserted. At 918, the Tx Common Mode Circuit is turned off.

Note that without implementing the present disclosure, the Tx Common Mode is not turned off in all power states. Mechanisms of the present disclosure can enhance the PIPE Specification to turn off the Tx Common Mode to save power. In sum, at least two mechanisms are provided to turn off the Tx Common Mode and, at the same time, the mechanisms remain backward compatible with the PIPE Specification before the enhancement. In general, the two mechanisms are: Turn OFF Tx Common Mode in power down state; and Turn OFF Tx Common Mode using a pin. Without the teachings of the present disclosure, the Tx Common Mode Circuit disable mechanism is not present in any I/O Controller Hub for the PCI Express.

Figure 10:
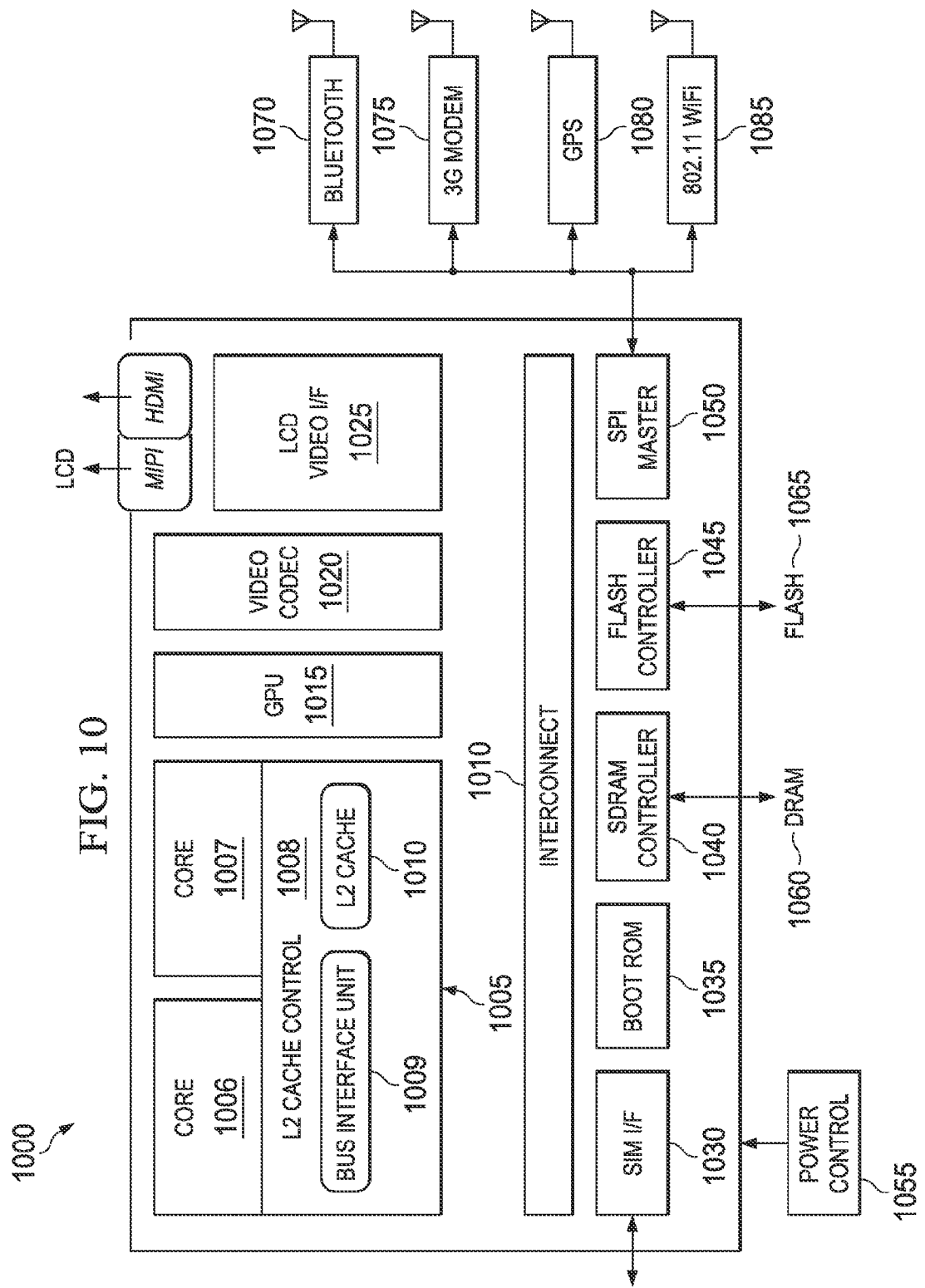
FIG. 10 is a simplified block diagram associated with an example ARM ecosystem system on chip (SOC) of the present disclosure.

FIG. 10 is a simplified block diagram associated with an example ARM ecosystem SOC 1000 of the present disclosure. One potential implementation of the present disclosure includes an integration of the power savings features discussed herein (which includes the prewake mechanism described) and an ARM component. For example, the particular implementation of FIG. 10 can be associated with any ARM core (e.g., A-9, A-15, etc.). Further, the architecture can be part of any type of tablet, smartphone (inclusive of Android phones, i-Phones), i-Pad, personal computer, server, video processing components, laptop computer (inclusive of any type of notebook), any type of touch-enabled input device, etc.

In this example of FIG. 10, ARM ecosystem SOC 1000 may include multiple cores 1006-1007, an L2 cache control 1008, a bus interface unit 1009, an L2 cache 1010, a graphics processing unit (GPU) 1015, an interconnect 1010, a video codec 1020, and a liquid crystal display (LCD) I/F 1025, which may be associated with mobile industry processor interface (MIPI)/high-definition multimedia interface (HDMI) links that couple to an LDC.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, this particular example may include a number of communication capabilities, interfaces, and features such as instances of Bluetooth 1070, a 3G modem 1075, a global positioning system (GPS) 1080, and an 802.11 WiFi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In one particular example, the core processor may implement an out-of-order superscalar pipeline with a coupled low-latency level-2 cache.

Figure 11:
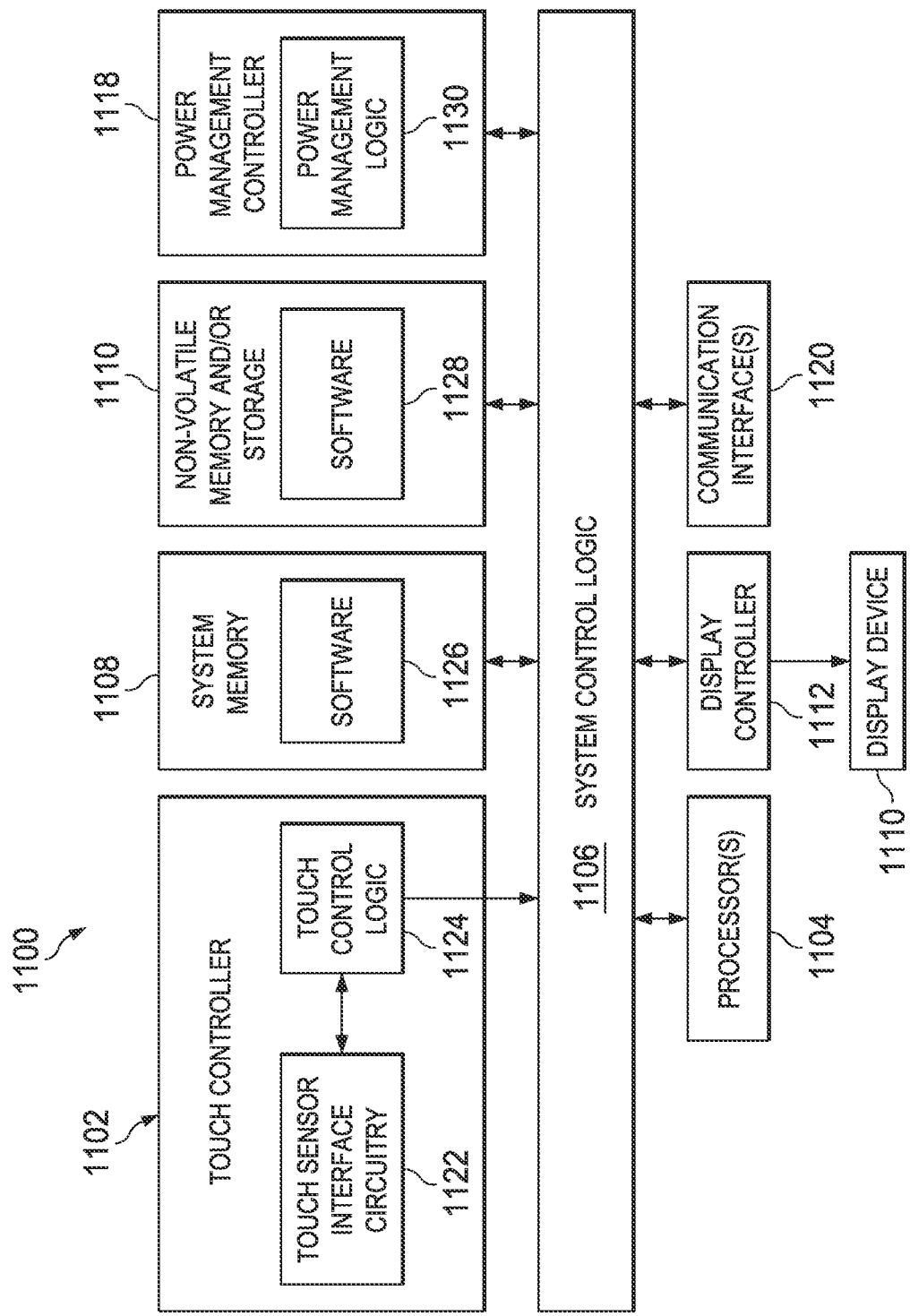
FIG. 11 is a simplified block diagram illustrating example logic that may be used to execute activities associated with the present disclosure.

FIG. 11 is a simplified block diagram illustrating potential electronics and logic that may be associated with any of the power saving operations discussed herein. More particularly, FIG. 11 illustrates an embodiment of an example system 1100 that may be included in prewake system 10, provided as part of an enhancement to the PIPE Specification, provided as part of any suitable tablet, mobile device, personal computer, or any other type of electronic device. System 1100 includes a touch controller 1102, one or more processors 1104, system control logic 1106 coupled to at least one of processor(s) 1104, system memory 1108 coupled to system control logic 1106, non-volatile memory and/or storage device(s) 1110 coupled to system control logic 1106, display controller 1112 coupled to system control logic 1106, display controller 1112 coupled to a display, power management controller 1118 coupled to system control logic 1106, and communication interfaces 1120 coupled to system control logic 1106.

System control logic 1106, in a particular embodiment, may include any suitable interface controllers to provide for any suitable interface to at least one processor 1104 and/or to any suitable device or component in communication with system control logic 1106. System control logic 1106, in a particular embodiment, may include one or more memory controllers to provide an interface to system memory 1108. System memory 1108 may be used to load and store data and/or instructions, for example, for system 1100. System memory 1108, in a particular embodiment, may include any suitable volatile memory, such as suitable dynamic random access memory (DRAM) for example. System control logic 1106, in a particular embodiment, may include one or more input/output (I/O) controllers to provide an interface to a display device, touch controller 1102, and non-volatile memory and/or storage device(s) 1110.

Non-volatile memory and/or storage device(s) 1110 may be used to store data and/or instructions, for example within software 1128. Non-volatile memory and/or storage device(s) 1110 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1118 includes power management logic 1130 configured to control various power management and/or power saving functions of prewake system 10 based upon whether an electronic device is in an open configuration or a closed configuration and/or a physical orientation of the electronic device. In one embodiment, power management controller 1118 is configured to reduce the power consumption of components or devices of system 1100 that may either be operated at reduced power or turned off when the electronic device is in the closed configuration. For example, in a particular embodiment when the electronic device is in a closed configuration, power management controller 1118 may perform one or more of the following: power down the unused portion of the display and/or any backlight associated therewith; allow one or more of processor(s) 1104 to go to a lower power state if less computing power is required in the closed configuration; and shutdown any devices and/or components, such as keyboard 108, that are unused when an electronic device is in the closed configuration.

Communications interface(s) 1120 may provide an interface for system 1100 to communicate over one or more networks and/or with any other suitable device. Communications interface(s) 1120 may include any suitable hardware and/or firmware. Communications interface(s) 1120, in a particular embodiment, may include, for example, a network adapter, a wireless network adapter, a telephone modem, and/or a wireless modem.

System control logic 1106, in a particular embodiment, may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one embodiment, at least one processor 1104 may be packaged together with logic for one or more controllers of system control logic 1106. In one embodiment, at least one processor 1104 may be packaged together with logic for one or more controllers of system control logic 1106 to form a System in Package (SiP). In one embodiment, at least one processor 1104 may be integrated on the same die with logic for one or more controllers of system control logic 1106. For a particular embodiment, at least one processor 1104 may be integrated on the same die with logic for one or more controllers of system control logic 1106 to form a System on Chip (SoC).

For touch control, touch controller 1102 may include touch sensor interface circuitry 1122 and touch control logic 1124. Touch sensor interface circuitry 1122 may be coupled to detect touch input over a first touch surface layer and a second touch surface layer of display 11 (i.e., display device 1110). Touch sensor interface circuitry 1122 may include any suitable circuitry that may depend, for example, at least in part on the touch-sensitive technology used for a touch input device. Touch sensor interface circuitry 1122, in one embodiment, may support any suitable multi-touch technology. Touch sensor interface circuitry 1122, in one embodiment, may include any suitable circuitry to convert analog signals corresponding to a first touch surface layer and a second surface layer into any suitable digital touch input data. Suitable digital touch input data for one embodiment may include, for example, touch location or coordinate data.

Touch control logic 1124 may be coupled to help control touch sensor interface circuitry 1122 in any suitable manner to detect touch input over a first touch surface layer and a second touch surface layer. Touch control logic 1124 for one embodiment may also be coupled to output in any suitable manner digital touch input data corresponding to touch input detected by touch sensor interface circuitry 1122. Touch control logic 1124 may be implemented using any suitable logic, including any suitable hardware, firmware, and/or software logic (e.g., non-transitory tangible media), that may depend, for example, at least in part on the circuitry used for touch sensor interface circuitry 1122. Touch control logic 1124 for one embodiment may support any suitable multi-touch technology.

Touch control logic 1124 may be coupled to output digital touch input data to system control logic 1106 and/or at least one processor 1104 for processing. At least one processor 1104 for one embodiment may execute any suitable software to process digital touch input data output from touch control logic 1124. Suitable software may include, for example, any suitable driver software and/or any suitable application software. As illustrated in FIG. 11, system memory 1108 may store suitable software 1126 and/or non-volatile memory and/or storage device(s).

Note that in certain example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the steps in the flows illustrate only some of the possible signaling scenarios and patterns that may be executed by, or within, the circuits discussed herein. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

Example Embodiment Implementations

One particular example implementation may include a system for reducing power in a processing environment that includes means for powering down a root port; means for initiating a first downstream cycle by a central processing unit (CPU) to the root port; means for identifying a power up activity for the CPU; and means for triggering an exit flow for a power state in conjunction with sending a second downstream cycle to the root port. In more particular embodiments, the triggering of the exit flow for the power state and the sending of the second downstream cycle to the root port occurs in a substantially parallel fashion. In addition, a prewake indicator can be sent to the root port to trigger the exit flow before the CPU is powered up and the second downstream cycle is sent.

In a different implementation, a system for reducing power consumption in a processing environment includes means for identifying a power management state associated with a central processing unit (CPU); means for applying a power down state through a common mode turn off; and means for applying a transmit (Tx) common mode disable pin to a physical layer (PHY) in order to change a power state level associated with the CPU. In more particular instances, the common mode disable pin is de-asserted to enable the Tx common mode. More specific implementations may include receiving a status signal at an input/output (I/O) controller to indicate a power state level. The power management states can include a link disable state, a runtime state, a detect state, and an unconfigured lanes state. The physical layer allows a root port to exit to a power state level by returning a status signal.

What is claimed is:

1. A method for reducing power consumption in a processing environment, the method comprising:
   initiating a downstream cycle by a central processing unit (CPU) to a root port, wherein the root port is a Peripheral Component Interconnect Express (PCIe) port;
   powering up the CPU, in response to the initiating;
   sending a prewake indicator to the root port to trigger an exit flow for a power state of the root port, in response to the initiating; and
   sending the downstream cycle to the root port, in response to a completion of the powering up.

2. The method of claim 1, further comprising:
   sending the downstream cycle from the root port to a device.

3. The method of claim 1, wherein the CPU is coupled to a plurality of high-speed serial input/output (I/O) ports.

4. The method of claim 1, wherein the power state is associated with a Peripheral Component Interconnect Express (PCIe) root port Idle Power state.

5. The method of claim 1, wherein the CPU sends the prewake indicator independently of an on-chip system fabric connecting the CPU and the root port.

6. The method of claim 1, wherein the downstream cycle waits for a CPU power-up latency and a power state exit time in a parallel fashion, before the downstream cycle is sent out to a PCI Express device through the root port.

7. An apparatus for reducing power consumption in a processing environment, the apparatus comprising:
   a central processing unit (CPU); and
   a root port configured to be powered down to a power state, wherein
   the root port is a Peripheral Component Interconnect Express (PCIe) port, and
   the CPU is configured to perform an initiation of a downstream cycle to the root port, to power up in response to the initiation, to send a prewake indicator to the root port to trigger an exit flow for a power state of the root port, in response to the initiation, and to send the downstream cycle to the root port, in response to a completion of the CPU powering up.

8. The apparatus of claim 7, wherein the downstream cycle is sent from the root port to a device.

9. The apparatus of claim 8, wherein the apparatus is configured to send the downstream cycle to the device in response to a reception of the downstream cycle at the root port.

10. The apparatus of claim 7, wherein the CPU is coupled to a plurality of high-speed serial input/output (I/O) ports.

11. The apparatus of claim 7, wherein the CPU sends the prewake indicator independently of an on-chip system fabric connecting the CPU and the root port.

12. The apparatus of claim 7, wherein the power state is associated with a Peripheral Component Interconnect Express (PCIe) root port Idle Power state.

13. The apparatus of claim 7, wherein the prewake indicator is sent to the root port before the CPU is powered up, and a triggering of the exit flow for the power state and a sending of the downstream cycle to the root port occurs in a parallel fashion.

14. The apparatus of claim 7, wherein the root port and the device power up, in response to a reception of the prewake indicator.

15. The apparatus of claim 14, wherein the root port sends the downstream cycle to the device, in response to both the root port receiving the downstream cycle and the root port and the device powering up.

16. A non-transitory, machine readable storage medium encoded with instructions comprising:
   instructions to initiate a downstream cycle by a central processing unit (CPU) to a root port, wherein the root port is a Peripheral Component Interconnect Express (PCIe) port;
   instructions to power up the CPU in response to an initiation of the downstream cycle;
   instructions to send a prewake indicator to the root port to trigger an exit flow for a power state of the root port, in response to the initiation; and
   instructions to send the downstream cycle to the root port in response to a completion of the powering up.

17. The medium of claim 16, wherein the CPU sends the prewake indicator independently of an on-chip system fabric connecting the CPU and the root port.

18. The medium of claim 16, the instructions further comprising:
   instructions to send the downstream cycle from the root port to a device.

19. The medium of claim 18, the instructions further comprising:
   instructions to send the downstream cycle to the device in response to a reception of the downstream cycle at the root port.

20. The medium of claim 16, wherein the CPU is coupled to a plurality of high-speed serial input/output (I/O) ports.

21. The medium of claim 16, wherein the power state is associated with a Peripheral Component Interconnect Express (PCIe) root port Idle Power state.

22. The medium of claim 16, the instructions further comprising:
   instructions to determine, in response to a triggering of the exit flow, whether the PCIe port and a PCIe device are powered up.

23. The medium of claim 16, the instructions further comprising:
   instructions to determine, in response to a sending of the downstream cycle, whether the downstream cycle reaches the PCIe port.

24. The medium of claim 22, the instructions further comprising:
   instructions to send the downstream cycle to the PCIe device, in response to a determination that the PCIe port and the PCIe device are powered up.

* * * * *